June 27, 1944.  H. R. ELLINWOOD  2,352,187
TEMPERATURE COMPENSATING ACCUMULATOR FOR HYDRAULIC SYSTEMS
Filed Dec. 31, 1942
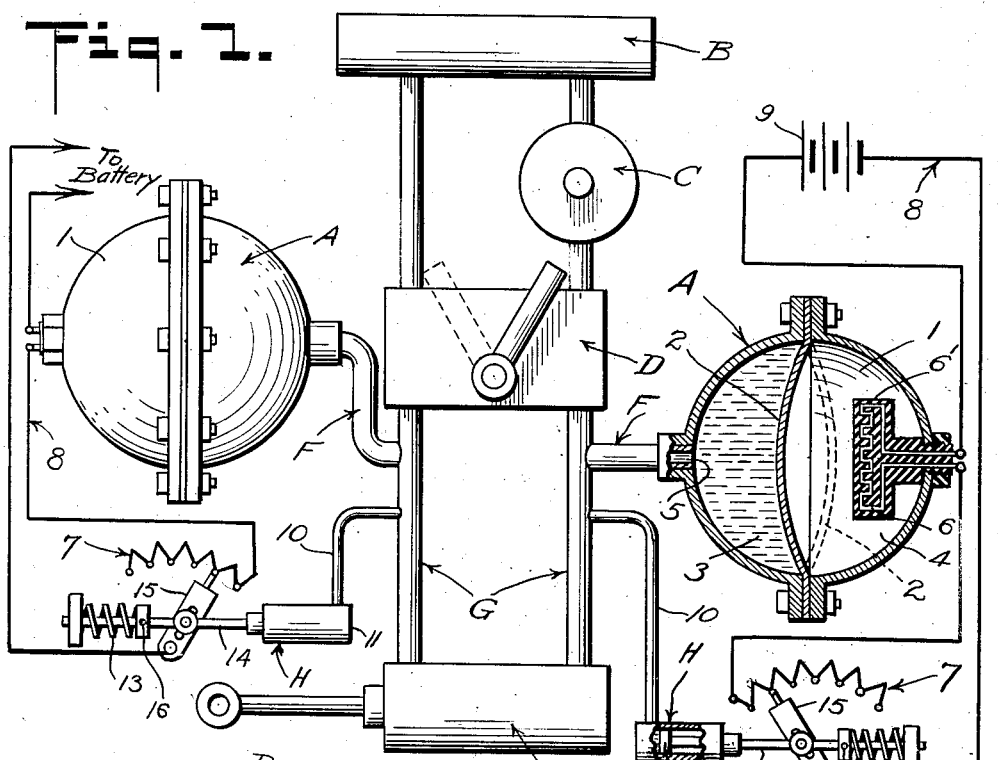
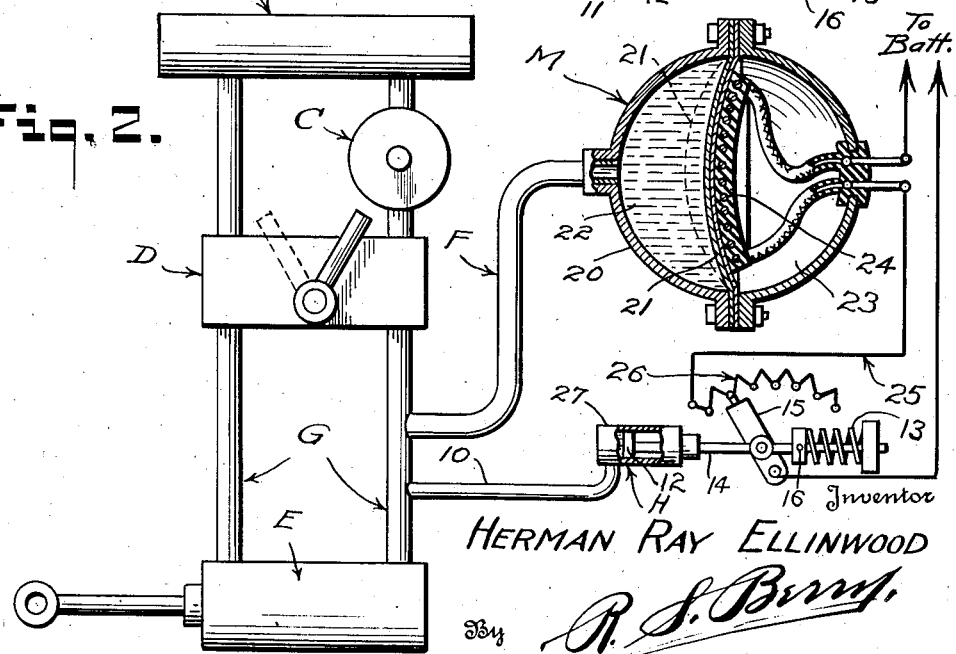
Inventor
HERMAN RAY ELLINWOOD
By R. S. Berry
Attorney Patented June 27, 1944

2,352,187

UNITED STATES PATENT OFFICE 2,352,187

TEMPERATURE COMPENSATING ACCUMULATOR FOR HYDRAULIC SYSTEMS

Herman Ray Ellinwood, Burbank, Calif., assignor to Adel Precision Products Corp., a corporation of California Application December 31, 1942, Serial No. 470,884

8 Claims. (Cl. 138—30)

This invention relates to hydraulic systems used in aircraft and more particularly pertains to a means for automatically compensating for temperature effected pressures and volume variations in such systems.

An object of my invention is to provide a hydraulic system accumulator which includes in addition to the usual diaphragm separated reservoir and compensating chambers, a heating means associated with the accumulator and automatically regulated by a fluid pressure responsive means connected in the main hydraulic system whereby the pressure and volume in the accumulator is varied by the heating means in direct ratio to the temperature-caused pressure and volume variances in the main system, so that the diaphragm in the instance of contraction and loss of pressure of the fluid in the main system will operate through the fluid in the reservoir chamber to restore the proper pressure and volume in the system and in the instance of expansion of the main system fluid will operate to cause the excess pressure and volume of the fluid to be relieved to the reservoir chamber, thereby maintaining the entire system at one stabilized pressure and volume.

Another object of this invention is to provide a thermally controlled or "heated" accumulator of the character described which may employ a liquid in the compensating chamber thereof rather than the usual air or gaseous fluid with the advantage that little or no servicing of the accumulator is required and a valved air intake is dispensed with.

A further object of my invention is to provide an accumulator of the character described wherein a bi-metallic diaphragm is heat controlled so as to buckle and change the displacement in the reservoir and compensating chambers to automatically compensate for temperature variations in the main hydraulic system in accordance with the provisions hereof.

Another purpose hereof is to provide an accumulator such as described, wherein by means of a bellows or other suitable fluid pressure responsive motor means connected in the main hydraulic line or lines, a rheostat is mechanically operated to control an electric heating element operatively associated with the accumulator in such manner as to vary the amount of heat available to the accumulator in substantially direct proportion to the fluctuation in volume of the main hydraulic system, whereby the heating element will introduce compensating fluctuations in the accumulator maintaining the entire system at one stabilized pressure.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a schematic view of a hydraulic system equipped with compensating accumulators embodying my invention;

Fig. 2 is a schematic view of a hydraulic system in which a modified form of my invention is used.

Referring to the drawing more specifically, and particularly to Fig. 1, accumulators A embodying my invention are connected in a hydraulic system which includes a reservoir B, a motor operated pump C, a control valve D, and a hydraulic cylinder E, the accumulators being in this instance connected by means of fluid lines F with the main lines G between the control valve and the hydraulic cylinder.

The accumulators each comprise a sectional spherical shell or housing 1 held between the sections of which is a diaphragm 2 defining on opposite sides thereof a reservoir chamber 3 and a compensating chamber 4. The reservoir chamber is connected with the main system by means of the fluid line F and an opening 5 in the shell 1 and is filled wth the hydraulic fluid. On the other hand the compensating chamber is sealed or closed and may contain air or other gaseous fluid or a suitable liquid which will readily expand and contract responsive to temperature changes. However, in the drawing the chamber 1 is shown as containing a gas, which is preferable to liquid because it expands and contracts more quickly in response to the action of a heater. By providing the diaphragm it is possible to have within said chamber 1 a body of liquid in communication with the hydraulic system and a separate body of gas surrounding the heater.

Associated with the accumulator is a heating means as here shown mounted in the chamber 4 and in the form of an electrical heating element 6 sealed in a jacket 6' of insulation material and regulated as to the amount of heat given off by a control means in this instance in the form of a rheostat 7 connected in series with the heating element in a simple electrical circuit 8 derived from a source of energy such as the battery 9. The rheostat is operated by a fluid pressure responsive motor means or actuator H connected to a main line F by means of a fluid line 10.

As here provided the fluid pressure actuator H includes a cylinder 11 in which a piston 12 is mounted to move responsive to variations in the pressure and volume in said main line, there being a spring means 13 connected with the piston rod 14 to urge the piston in one direction. The rod 14 is connected with the control member 15 of the rheostat so as to operate the rheostat to increase or decrease the heating action of the heating element 6 dependent on the direction of movement of the piston and piston rod. The tension of the spring is regulated by the adjusting means 16 to normally set the rheostat at the desired point dependent on the particular hydraulic system and conditions at hand.

In the present instance the arrangement of the actuator H and rheostat 7 is such that the heating action of the heating element is increased as the contraction of the fluid in the system increases, it being noted that the diminution of pressure and volume in the main system will allow the spring means 13 to force the piston and rod inwardly thereby moving the control 15 to decrease the resistance of the rheostat and increase the flow of electrical energy to the heating element. As the heating action of the heating element 6 increases, the fluid in the compensating chamber expands and the pressure thereof increases and operates through the diaphragm and the liquid in the reservoir chamber to restore the predetermined proper working pressure and volume of the fluid in the main system.

Upon thermal expansion of the main system the pressure thereof increases so that the piston 12 and rod 14 are moved outwardly thereby operating the rheostat to increase the resistance to the flow of electrical energy to the heating element 6 and reducing the heating action thereof. This causes a reduction of pressure and volume in the compensating chamber whereupon the thermostat will yield to the increased pressure of the fluid thus developed in the system and of course in the reservoir chamber thereby relieving into the accumulators the excess pressure and volume in the main system.

It is now seen that inasmuch as the heating action of the heating means in the accumulator is in substantially direct proportion to the temperature variances in the main system, there will be automatically maintained the desired pressure and volume as predetermined to best control the pressure and volume of the particular system.

The ohmage of the rheostat 7, the normal setting thereof, the thermal capacity of the heating element 6 and the setting of the spring means 13, are factors making possible a thermal action in the accumulator to create and maintain the desired predetermined stabilized pressure and volume in the particular system.

The dual accumulators A hereof as shown in Fig. 1 make possible an accuracy of compensation not usually achieved where a single accumulator is used in a double line system.

A modified form of my invention as shown in Fig. 2 comprises an accumulator M made up of a shell 20, a diaphragm 21 and reservoir and compensating chambers 22 and 23 all in substantially the same arrangement as shown in Fig. 1, except that the diaphragm is bi-metallic and operates as a thermostat under the influence of a heating element 24.

This heating element is connected to an electrical circuit 25 and controlled by a rheostat 26 in the same manner as shown in Fig. 1 and the rheostat is operated by a pressure responsive device 27 corresponding to the one shown in Fig. 1. However, as here provided the heating element 24 is mounted on the thermostat-diaphragm 21 preferably on the compensating chamber side thereof so that the diaphragm will buckle and change the displacement of both chambers responsive to the thermal action of the heating element.

The arrangement is such that the diaphragm will buckle inwardly relative to the compensating chamber when thermal expansion of the main system fluid takes place and a proportional diminution of heat occurs at the diaphragm thereby relieving excess pressure and volume into the reservoir chamber. When contraction of the main system fluid occurs the heating element increases its heating action and causes the diaphragm to buckle into the reservoir chamber thereby restoring the pressure and volume in the same manner as in the device shown in Fig. 1. This buckling action of the diaphragm is accelerated by reason of the fact that the heater at the same time expands the air in the closed chamber 23 thus creating additional pressure against the right hand side of the diaphragm as viewed in the drawing.

While I have shown and described specific embodiments of my invention I do not limit myself to the exact details of construction set forth and the invention embraces such changes, modifications and equivalents of the parts and their formation and arrangement as come within the purview of the appended claims.

I claim:

1. In a temperature compensating accumulator for a hydraulic system, an accumulator shell, a diaphragm mounted in and defining with said shell a reservoir chamber for liquid and a closed compensating chamber adapted to contain a gas, means affording the communication of said reservoir chamber with a hydraulic system, a heating means operable in said compensating chamber for varying the pressure and volume therein whereby through the diaphragm, the pressure and volume in the reservoir chamber is likewise varied, and a control means for said heating means adapted to be connected in said system for operation responsive to pressure variations in said system to proportionately vary the heating action of said heating means.

2. In a temperature compensating accumulator for a hydraulic system, an accumulator shell, a diaphragm mounted in and defining with said shell a reservoir chamber and a closed compensating chamber adapted to contain a gas, means affording the communication of said reservoir chamber with a hydraulic system, a heating means operable in said compensating chamber for controlling the movement of said diaphragm to change the displacement of said chambers, and a control means for said heating means adapted to be connected with said hydraulic system for operation responsive to pressure variations therein, to vary the heating action of said heating means.

3. In a temperature compensating accumulator for a hydraulic system, an accumulator shell, a diaphragm mounted in and defining with said shell a reservoir chamber and a compensating chamber, means affording the communication of said reservoir chamber with a hydraulic system, a heating means operable in said compensating chamber for controlling the movement of said diaphragm to change the displacement of said chambers, and a control means for said heating means adapted to be connected with said hydraulic system for operation responsive to pressure variations therein, to vary the heating action of said heating means, said diaphragm being formed as a bi-metallic thermostat and supporting said heating means thereon so that it will buckle responsive to the controlled action of said heating means.

4. In a temperature compensating accumulator for a hydraulic system, an accumulator housing, a diaphragm mounted in and defining with said housing a hydraulic fluid filled reservoir chamber and a sealed gas containing compensating chamber, a heating means associated with said housing for thermally varying the pressure of the fluid therein, means for affording free communication between the reservoir chamber and an operating fluid line of a hydraulic system, and a regulating means for said heating means adapted for connection with said hydraulic system and operating responsive to pressure variations in said system to vary the heating action of said heating means.

5. In a temperature compensating accumulator for a hydraulic system, a housing, a diaphragm mounted in and forming with said housing a hydraulic fluid-containing reservoir chamber and a sealed compensating gas containing compensating chamber, means for affording open communication between said reservoir chamber and an operating line of a hydraulic system, a heating means associated with said housing for effecting movement of said diaphragm responsive to a variable heating action thereof, and a control means operating responsive to thermal expansion and contraction of the operating fluid in said system for varying the heating action of said heating means.

6. In a hydraulic system including an operating fluid line, an accumulator housing, a diaphragm in said housing defining therewith a reservoir chamber and a sealed compensating chamber containing a gas, a fluid line affording open communication between the operating fluid line and said reservoir chamber, a heating means in said compensating chamber, and a control means connected in said system and being responsive to pressure variations therein for varying the heating action of said heating means upon the gas in said compensating chamber.

7. In a temperature compensating accumulator for a hydraulic system, a housing, a diaphragm mounted in and forming with said housing a hydraulic fluid-containing reservoir chamber and a sealed compensating gas-containing compensating chamber, means for affording open communication between said reservoir chamber and an operating line of a hydraulic system, a heating means associated with said housing for effecting movement of said diaphragm responsive to a variable heating action of the gas in said compensating chamber, and a control means operating responsive to thermal expansion and contraction of the operating fluid in said system for varying the heating action of said heating means, said heating means including an electric heating element, an electric circuit therefor, said control means including a rheostat in said circuit, a fluid responsive motor means connected in said system, and means of operative connection between said motor means and said rheostat.

8. In a temperature compensating accumulator for a hydraulic system, an accumulator shell, a diaphragm mounted in and defining with said shell a reservoir chamber and a sealed compensating chamber, the latter chamber being filled with a gas, means affording the communication of said reservoir chamber with a hydraulic system, a heating means operable in said compensating chamber for controlling the movement of said diaphragm to change the displacement of said chambers, and a control means for said heating means adapted to be connected with said hydraulic system for operation responsive to pressure variations therein, to vary the heating action of said heating means, said diaphragm being formed as a bi-metallic thermostat and supporting said heating means thereon so that it will buckle responsive to the controlled action of said heating means.

HERMAN RAY ELLINWOOD.